US010198053B2

(12) United States Patent
Costa et al.

(10) Patent No.: US 10,198,053 B2
(45) Date of Patent: Feb. 5, 2019

(54) TECHNIQUES FOR COMMUNICATING DATA AMONGST CONTROLLERS IN A POWER SUPPLY SYSTEM

(71) Applicant: Chloride Srl, Castel Guelfo (IT)

(72) Inventors: Pier Ugo Costa, Imola (IT); Donatella Zaccheroni, Bologna (IT); Paolo Mistroni, Ozzano Dell' Emilia (IT)

(73) Assignee: Vertiv S.R.L., Piove di Sacco (IT)

( * ) Notice: Subject to any disclaimer, the term of this patent is extended or adjusted under 35 U.S.C. 154(b) by 374 days.

(21) Appl. No.: 14/186,015

(22) Filed: Feb. 21, 2014

(65) Prior Publication Data
US 2014/0277810 A1 Sep. 18, 2014

Related U.S. Application Data

(60) Provisional application No. 61/787,306, filed on Mar. 15, 2013.

(51) Int. Cl.
*G06F 1/26* (2006.01)
*G06F 1/30* (2006.01)
*G05D 3/12* (2006.01)

(52) U.S. Cl.
CPC .......... *G06F 1/30* (2013.01); *G06F 1/263* (2013.01)

(58) Field of Classification Search
CPC .................................. G06F 1/30; G06F 1/263
USPC .......................................................... 700/297
See application file for complete search history.

(56) References Cited

U.S. PATENT DOCUMENTS

| 5,381,554 A * | 1/1995 | Langer ...................... G06F 1/26 307/38 |
| 5,483,463 A * | 1/1996 | Qin ........................ H02J 9/062 307/64 |
| 5,889,933 A * | 3/1999 | Smith ...................... G06F 1/30 714/20 |
| 5,923,099 A * | 7/1999 | Bilir .......................... G06F 1/30 307/64 |
| 6,108,226 A * | 8/2000 | Ghosh ...................... H02J 3/24 323/255 |
| 6,298,449 B1 | 10/2001 | Carter |

(Continued)

FOREIGN PATENT DOCUMENTS

WO WO-2000033098 A1 6/2000

OTHER PUBLICATIONS

Guerrero et al., "Control of Distributed Uninterruptible Power Supply Systems", 2008, IEEE, 15pg.*

(Continued)

*Primary Examiner* — Ryan D. Coyer
(74) *Attorney, Agent, or Firm* — Harness, Dickey & Pierce, P.L.C.

(57) ABSTRACT

A method is provided for communicating data amongst controllers in a power supply system. The method include receiving a present measure of a parameter indicative of an operating state of an uninterruptible power supply (UPS); comparing the present measure to a control window for the parameter, where the control window defines a minimum value for the parameter and a maximum value for the parameter; updating the control window based on the present measure when the present measure falls outside of the control window; and transmitting the present measure via a controller area network to a managing controller when the present measure falls outside of the control window.

18 Claims, 5 Drawing Sheets

(56) References Cited

U.S. PATENT DOCUMENTS

| | | | |
|---|---|---|---|
| 6,629,247 B1* | 9/2003 | Hall | H02J 9/06 307/66 |
| 6,756,894 B2 | 6/2004 | Saitou | |
| 7,082,541 B2* | 7/2006 | Hammond | G06F 1/30 709/202 |
| 7,181,630 B2* | 2/2007 | Kadoi | G06F 1/26 709/202 |
| 7,711,814 B1 | 5/2010 | Emerick et al. | |
| 7,849,335 B2* | 12/2010 | Terry | H02J 9/061 713/300 |
| 8,148,846 B2* | 4/2012 | Masciarelli | H02J 9/062 307/26 |
| 8,838,257 B1* | 9/2014 | Ito | G11B 19/28 360/78.05 |
| 2005/0071699 A1 | 3/2005 | Hammond et al. | |
| 2005/0076634 A1* | 4/2005 | Anilovich | F02D 41/1495 60/274 |
| 2006/0050465 A1 | 3/2006 | Cho et al. | |
| 2007/0208535 A1* | 9/2007 | Misra | G01D 1/18 702/182 |
| 2009/0230772 A1* | 9/2009 | Caudill | H02J 3/46 307/44 |
| 2010/0004761 A1* | 1/2010 | Flanders | G05B 9/03 700/28 |
| 2011/0061015 A1* | 3/2011 | Drees | G05B 15/02 715/771 |
| 2011/0068746 A1* | 3/2011 | Rocci | H01M 10/441 320/118 |
| 2012/0022700 A1* | 1/2012 | Drees | G05B 15/02 700/276 |
| 2012/0181871 A1* | 7/2012 | Johansen | H02J 9/062 307/66 |
| 2013/0204443 A1* | 8/2013 | Steven | G06Q 50/06 700/286 |
| 2013/0308347 A1* | 11/2013 | Sato | H02M 3/337 363/21.03 |

OTHER PUBLICATIONS

Jiang et al., "Active Current Sharing and Source Management in Fuel Cell—Battery Hybrid Power System", 2010, IEEE, 10pg.*

Lasseter et al., "Integration of distributed energy resources. The CERTS Microgrid Concept", 2002, Lawrence Berkeley National Laboratory, 30pg.*

* cited by examiner

TECHNIQUES FOR COMMUNICATING DATA AMONGST CONTROLLERS IN A POWER SUPPLY SYSTEM

CROSS-REFERENCE TO RELATED APPLICATIONS

This application claims the benefit of U.S. Provisional Application No. 61/787,306, filed on Mar. 15, 2013. The entire disclosure of the above application is incorporated herein by reference.

FIELD

The present disclosure relates generally to techniques for communicating data in a power supply system.

BACKGROUND

An uninterruptible power supply (UPS) operates to provide emergency power to a load when a primary input power source fails. A UPS is typically used to protect computers, data centers, telecommunications equipment or other electrical equipment. Accordingly, it is important to monitor the operating conditions of the UPS and identify any potential or actual problems with the UPS, such as mains power failures, output power failures, overload conditions, etc. Monitoring and controlling a UPS, however, requires a large amount of information. This information may be shared amongst multiple controllers of the UPS. Therefore, it is desirable to develop improved techniques for communicating data amongst controllers residing in a power supply system.

This section provides background information related to the present disclosure which is not necessarily prior art.

SUMMARY

A method is provided for communicating data amongst controllers in a power supply system. The method include receiving a present measure of a parameter indicative of an operating state of an uninterruptible power supply (UPS); comparing the present measure to a control window for the parameter, where the control window defines a minimum value for the parameter and a maximum value for the parameter; updating the control window based on the present measure when the present measure falls outside of the control window; and transmitting the present measure via a controller area network to a managing controller when the present measure falls outside of the control window. More specifically, the present measure may be transmitted to the managing controller when the present measure falls outside of the control window and in response to receiving a synchronization signal from the managing controller.

In one aspect, the local controller receives an earlier measure of the parameter prior to receiving the present measure. The local controller operates to compare the earlier measure to the control window for the parameter; stores, the earlier measure as either a maximum value or a minimum value for the parameter when the earlier measure falls outside of the control window; and transmits the earlier measure to the managing controller in response to receiving the synchronization signal.

In another aspect, the local controller compares the present measure to a value for the parameter transmitted during a preceding reporting time interval; and transmits the present measure to the managing controller only when the present measure differs from the value of the parameter transmitted during the preceding time interval.

Another aspect of this disclosure is directed to a power supply system. The power supply system includes: an uninterruptible power supply (UPS) having an output terminal selectively coupled to at least one of a bypass voltage source and an uninterruptible power source; a bypass switch electrically connected between the bypass voltage source and the output terminal; and a UPS switch electrically connected between the uninterruptible power source and the output terminal. A first local controller is interfaced with the uninterruptible power supply and configured to receive a present measure of a parameter associated with the UPS. A managing controller is in data communication with the first local controller, wherein the local controller is operable to compare the present measure to a control window and transmit the present measure to the managing controller when the present measure falls outside of the control window.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
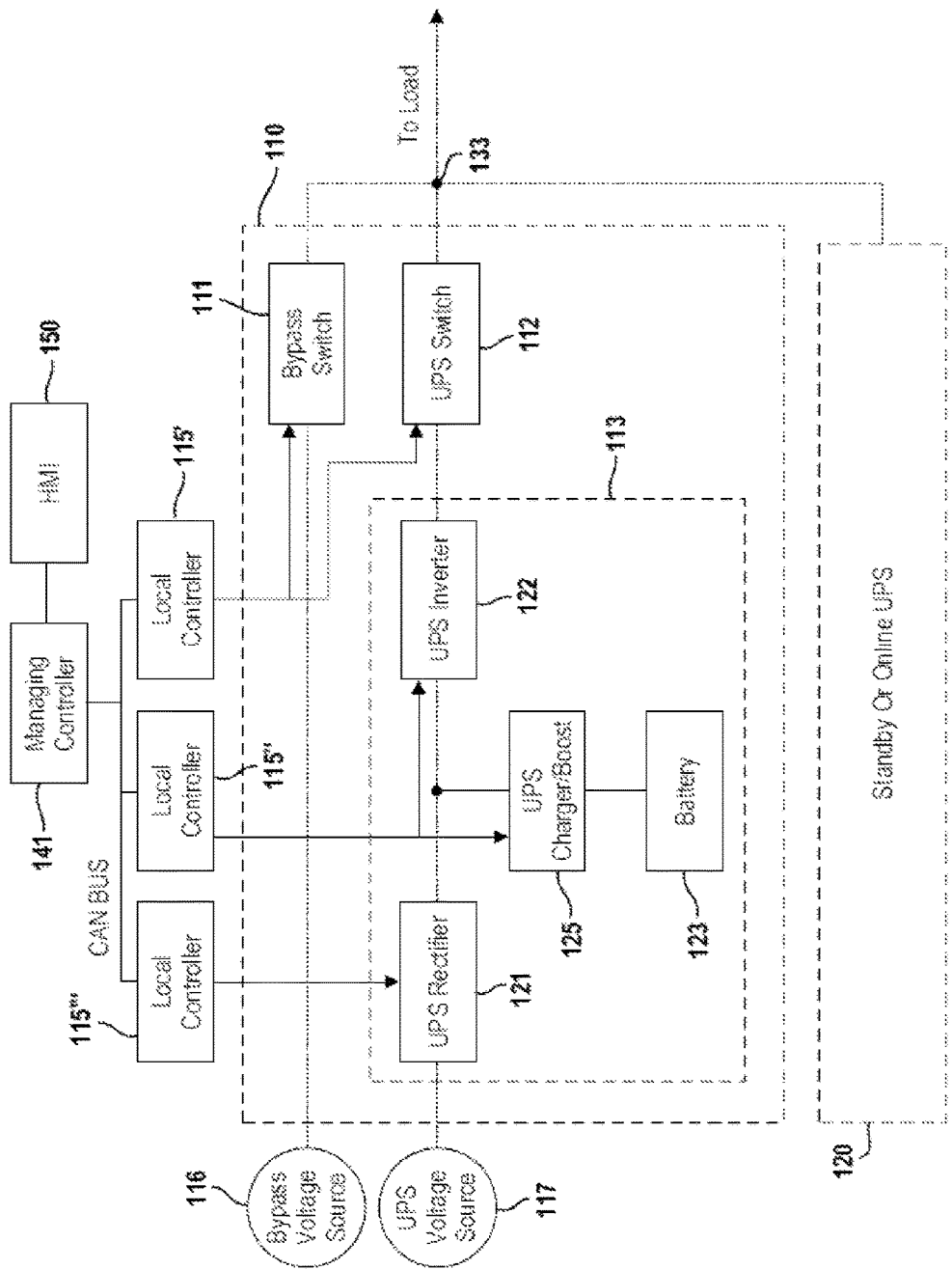
FIG. 1 is a schematic of an exemplary power supply system.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 is a simplified schematic of an exemplary power supply system 100. The power supply system 100 is comprised generally of an uninterruptible power supply (UPS) 110 and a standby UPS 120. In some embodiments, the UPS 110 and the standby UPS 120 can be electrically coupled via a static transfer switch (not shown) to a load. While reference is made to a particular arrangement for the power supply system and its components, it is understood that the communication techniques described below are applicable to other arrangements.

An uninterruptible power supply (UPS) 110 is typically used to protect computers, data centers, telecommunications equipment or other electrical equipment. The UPS 110 generally includes a bypass switch 111, a UPS switch 112, a UPS converter 113, an output terminal 114 and one or more local controllers 115. The bypass switch 111 is coupled between a bypass voltage source 116 and the output terminal 114 and configured to receive an AC input signal from the bypass voltage source 116. In a similar manner, the UPS converter 113 is coupled between a UPS voltage source 117 and the output terminal 114 and configured to receive an AC signal from the UPS voltage source 117. The UPS switch 112 is interposed between an output of the UPS converter 113 and the output terminal 114. In other embodiments, the UPS switch 112 may be omitted from the topology.

The UPS converter 113 further includes a rectifier 121, an inverter 122, boost circuit 123 and a battery 124. The rectifier 121 converts the AC input from an AC signal to a DC signal; whereas, the inverter 122 converts a DC signal to an AC signal. The inverter 122 is configured to receive an input signal from either the rectifier 121 or the battery 124. The battery 124 supplies the input signal to the inverter 122 if the UPS voltage source 117 is not available. The UPS converter 113 can also include a boost circuit 125 disposed between the battery 124 and the inverter 122. Such converter arrangements are known in the art.

In normal mode of operation, the UPS switch 112 is closed while the bypass switch 111 is open such that the UPS converter 113 supplies power to the load. If the UPS fails, the bypass switch 111 is closed and the UPS switch 112 is opened so that the bypass source 116 supplies power to the load (which is commonly referred to as bypass mode). In economy mode, the bypass switch 111 and the UPS switch 112 are both closed. In this arrangement, the bypass source 116 supplies power to the load but the UPS converter 113 is available to supply power immediately if the bypass source 116 fails. When the bypass source fails, there can be a brief interruption of voltage at the output terminal 114 while switching from economy mode to normal mode.

In one embodiment, a first local controller 115' monitors the operating conditions of the UPS 110 and controls the bypass switch 111 and the UPS switch 112 depending on the selected mode of operation and the operating conditions. To do so, the first local controller 115' is configured to receive measures for different parameters indicative of the operating condition of the UPS 110, where the measures may be captured by different types of sensors. Exemplary operating parameters may include but are not limited to voltage and frequency of the signal from the primary voltage source as well as voltage and frequency of the signal from the bypass voltage source.

A second controller 115" may be used to control the power converters inside the UPS 110. For example, the second controller 115" can vary the duty cycle of the switching devices in inverter 122 so that the inverter provides a desired output voltage. Likewise, the second local controller 115" is configured to receive measures for different parameters indicative of the operating condition of the UPS 110. Exemplary operating parameters may include but are not limited to output voltage, output frequency, output current and inverter temperature. It is readily understood that other types of operating parameter may be monitored by the local controllers. It is also understood that the controller functionality can be combined into a single controller or segmented amongst two or more different controller. In an exemplary embodiment, the local controllers 115 are implemented as a microcontroller. In other embodiments, controller may refer to, be part of, or include an application specific integrated circuit (ASIC); an electronic circuit; a combinational logic circuit; a field programmable gate array (FPGA); a microprocessor that executes code; other suitable components that provide the described functionality; or a combination of some or all of the above.

During operation, the local controller 115' is configured to monitor operating parameters of the preferred voltage source and the alternate voltage source. For example, the load terminal 133 may be receiving power from the preferred voltage source, i.e., UPS 110. The local controller 115' in turn monitors the amplitude and/or frequency of the voltage signal received from the UPS 110. When either parameter falls outside an acceptable range, the local controller 115' may transfer from the preferred voltage source 117 to the alternate voltage source 116. To do so, the local controller 115' controls the conductive state of the UPS switch 112 and the bypass switch 111. Thus, the controller local 115' operates to selectively couple one of the preferred voltage source 117 or the alternate voltage source 116 to the load terminal in accordance with the monitored operating parameters.

A managing controller 141 coordinates communication amongst the local controllers 115. In one embodiment, the managing controller 141 is in data communication via a controller area network (CAN) 142 with the local controllers although other types of data networks are contemplated by this disclosure. Local controllers can monitor various operating parameters associated with the UPS 110 and selectively report the same to the managing controller 141 as will be further described below. The managing controller 141 can in turn accumulate the operating parameters and report them to a remote monitoring and diagnostic service 150. For further details regarding an exemplary remote monitoring and diagnostic service, reference may be had to the LIFE.net Remote Diagnostic Service commercially available from Emerson Network Power.

Figure 2:
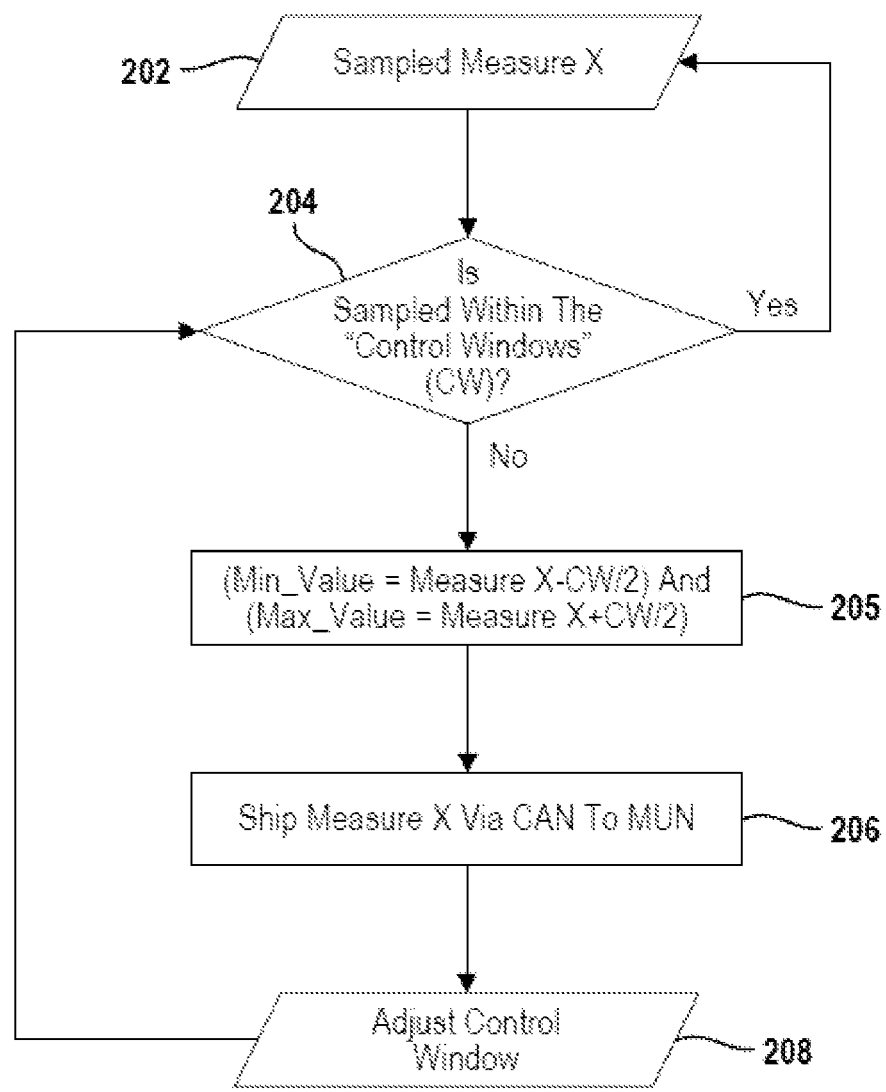
FIG. 2 is a flowchart depicting an exemplary technique for communicating data amongst controllers of the power supply system.

Managing such a power supply system 100 can involve a large amount of information (i.e., events and measurements) being transmitted across the network. An exemplary method for communicating data across the network is further described in relation to FIG. 2. The method is described as being implemented by a local controller when reporting measurements to the managing controller. It is envisioned that this method may be used to report other types of data, such as events, as well as report data from the managing controller to a remote diagnostic service.

Each local controller may be configured to receive parameter measurements. Upon receiving a parameter measure at 202, the present measure is compared at 204 to a control window for the parameter, where the control window is defined by a minimum value for the parameter and a maximum value for the parameter. The parameter may be measured periodically. In this embodiment, the parameter measures are not reported by the local controller so long as the parameter remains within the control window.

Once the parameter measure goes outside the control window, the parameter measure is reported at 206 by the local controller to the managing controller. In one embodiment, the parameter measure is transmitted immediately by the local controller. In other embodiments, the parameter measure is transmitted at periodical time intervals. In these embodiments, a flag can be raised when a parameter measure goes outside the control window and used by a handler in charge of delivering a message. In addition, the control window can be computed at 206 and updated at 208 based on the present measure of the parameter. For example, the control window may be centered around the present measure of the parameter. Other techniques for updating the control windows are also contemplated by this disclosure.

Figure 3:
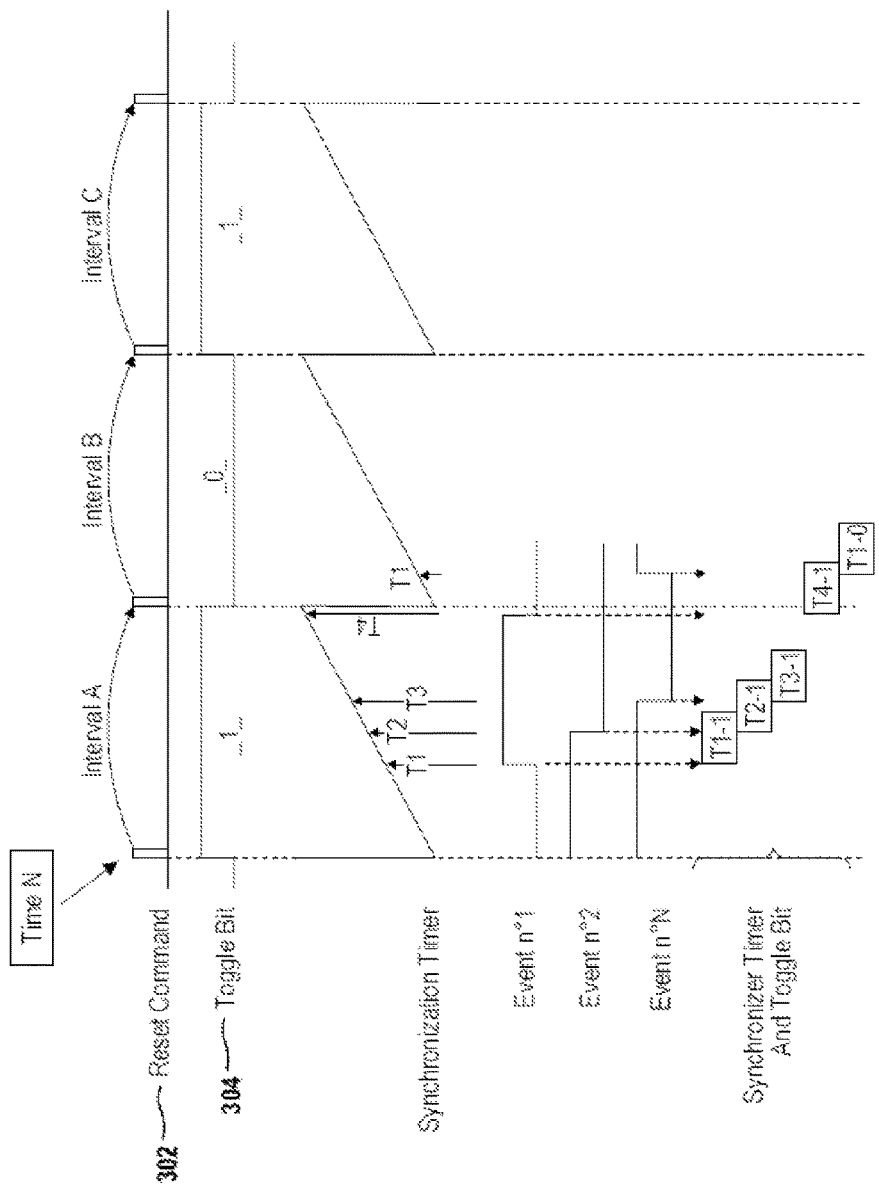
FIG. 3 is a diagram illustrating an exemplary synchronization scheme for coordinating communication amongst the controllers.

In one embodiment, the managing controller 141 is configured with a real time clock; whereas, the local controllers 115 are not equipped with a real time clock. In this case, a latching mechanism can used to synchronize communication between the controllers as shown in FIG. 3. That is, the managing controller 141 issues a synch or reset command 302 at periodic intervals (e.g., every 100-500 milliseconds). The managing controller will be configured to broadcast the synch command before the synchronization timer maintained by the local controller reaches a maximum value.

In response to the synch command, the local controller resets the local synchronization timer and stores the toggle bit value. When an event occurs in one of the local controllers, the local controller can respond by sending a message to the managing controller. The local controller may send a message, for example to report events whose status has changed or to report measures which fall outside of their control windows. In an exemplary embodiment, the messages sent by the local controller may include an event identifier, the value of the toggle bit received from the managing controller and the time (e.g., T1 in FIG. 3) from the synchronization timer maintained by the local controller as shown below

| CAN TELEGRAM N | EVENT #1 | 1 | TN |
|---|---|---|---|
| | <EVENT ID> | <TOGGLE BIT> | <SYNCH. WORD> |

By combining the time from the real time clock maintained by the managing controller with the synchronization time send by the local controller, the managing controller can determine an absolute time for the event being reported by the local controller. With reference to FIG. 3, the absolute time for the first event (i.e., Event n1) may be computed by adding Time N+T1.

Due to the latency delay between the sampling at the local controller and the processing on managing controller, it could be that a frame is send with the synchronization word referred to certain interval while it is processed by the managing controller during the next interval. To overcome this problem, the reset command sent by the managing controller 141 will include also a "toggle bit" 304 that will have an alternating value between zero and one. The value of the toggle bit is sent along with the resent command 302 to the local controller. The local controller can in turn store the value of the toggle bit and append the value of the toggle bit to the messages sent by the local controller to the managing controller. In this way, the managing controller 141 responsible for sorting out the frame received, will understand that the frame T4-1 belongs the INTERVAL A while T1-0 belongs the INTERVAL B.

Figure 4:
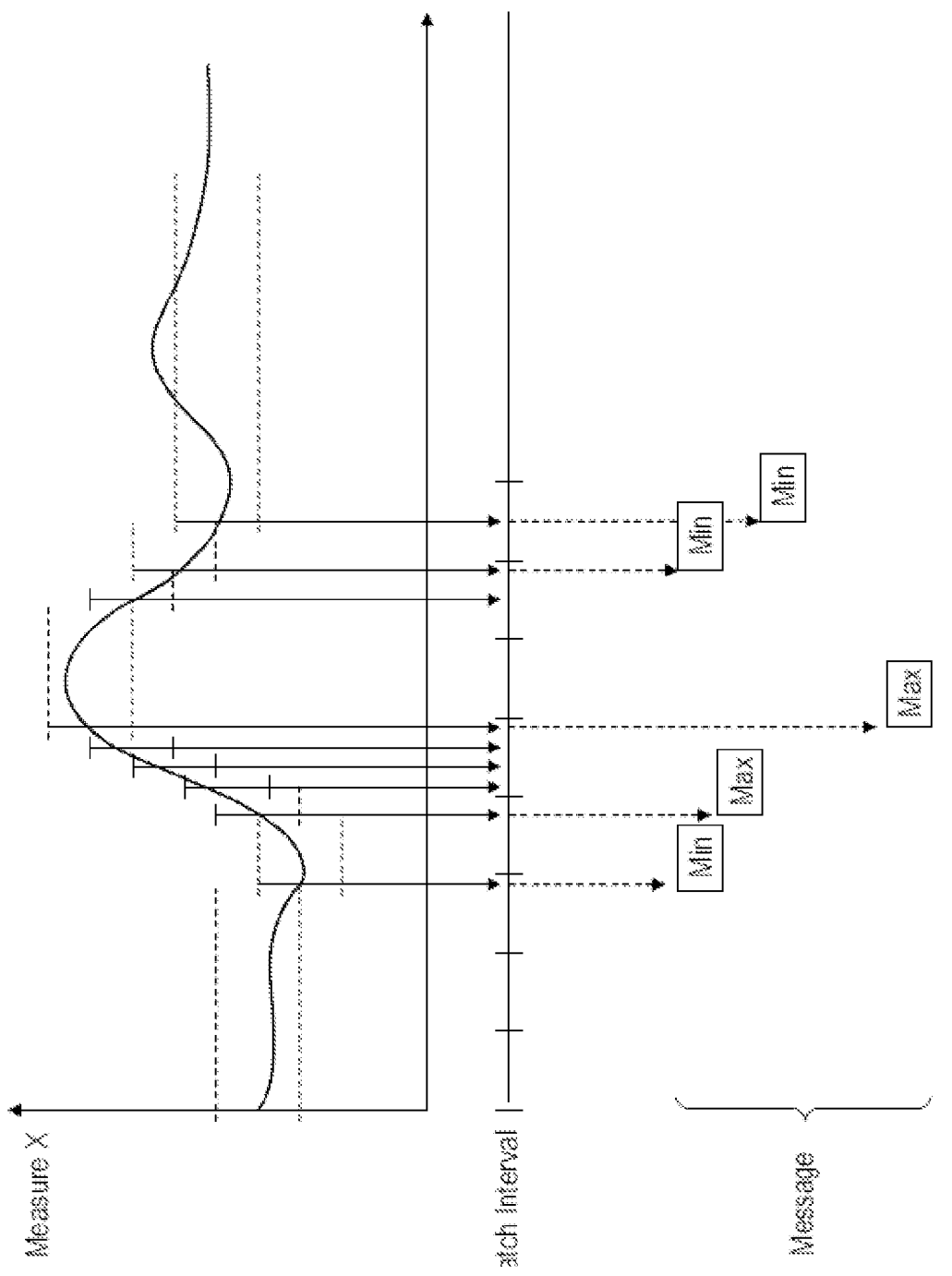
FIG. 4 is a diagram illustrating how measurement values are published by a controller during different latch intervals.

Diagnostics of the measurement trend is not improved by the use of the control window because the measurement data is not sent as soon as it crosses the control window limits. Rather, it is sent every latch interval, including the absolute minimum and maximum values sampled within that interval and the current value as shown in FIG. 4. Thus, a shorter latch interval results in an improved diagnostics on measurements trend.

An exemplary data structure for tracking the measurement trends within a latch period by a local controller is provided below.

```
CAN Id         // identifier for a given parameter
UMINVFlag;     // 1 = min value updated for publishing
UMAXVFlag;     // 1 = max value updated for publishing
```

```
URTVFlag;      // 1 = current value updated for publishing
int MCWWidth;  // Measure Control Window Width (=tolerance value)
``` for the measure from which the dynamic upper and lower thresholds values are derived

```
MINValue       // Min Value
MINVSWord      // Min Value Sync. Word including toggle
MAXValue       // Max Value
MAXVSWord      // Max Value Sync. Word including toggle
RTValue        // current Value
LastRTValue    // last published value
```

The toggle value should be inserted as the value is updated: if both min and max values are updated with the same latch interval, it is possible that they are assigned different toggle value.

Initially, avoiding the reset of all min and max values of the measurements was a requirement to prevent the overload of the CAN bus 142. In some instances, this would be no longer a problem, because the reset could be done on the local controller independently, without any request from the managing controller, at the end of each latch interval. The reset would imply that every latch interval a new minimum and a new maximum values should be delivered via CAN bus.

Beside the minimum and maximum values, the current value must be published (if different from the previously published one). If the actual measurement value wouldn't be published, a situation could occur where the last published value does not represent the actual measurement value, and the actual measurement value may not be published for a significant time, at least until it crosses the control window boundaries. The absolute minimum and maximum must still be sampled within the latch interval not to miss fast transient values. For transients faster than the latch interval, only the minimum and maximum of the transient can be available, not the measurement trend within the transient.

Two reporting criteria are set forth for publishing measurement values. First, minimum and maximum values of fast transients completed within a latch interval must be delivered in order to transfer exhaustive information to a remote diagnostic service. Second, the last 'current measurement value' sampled must be delivered in order to transfer the real time measurement trend to the rest of diagnostics tools. This value may be slightly different from the last published one. If the difference is such that it keeps inside the previous published value's control window, the value may not be published, as it was already transferred to the managing controller, unless five seconds have elapsed since last real time measurement transmission: in this latter case the last measurement sampled is transferred without any consideration of the dynamic window, in order to refresh the diagnostics tools. Other types of reporting criteria also fall within the broader aspects of this disclosure.

Figure 5A:
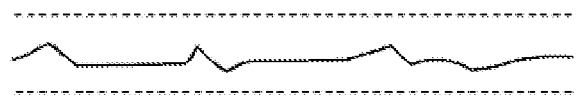
FIGS. 5A-5E are diagrams illustrating how an exemplary reporting criteria is applied to different measurement scenarios.
Figure 5B:
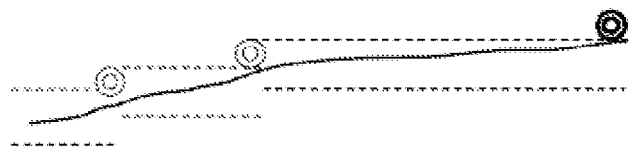

FIGS. 5A-5E further illustrates the application of these two reporting criteria. In FIG. 5A, the measurement value 501 remains between the minimum value 502 and the maximum value 503 of the control window and thus no value is published by the controller. In FIG. 5B, the maximum value of the control window is exceeded three times as the sampled parameter increases during the latch period. The first two times the parameter exceeds the maximum value, the measurement value is stored locally as the maximum value. In addition, the control window is updated so as to be centered around the current value. The sampled parameter again exceeds the maximum value at the end of the latch period. This measurement value is now published by the controller as both the current value and the maximum value.

Figure 5C:
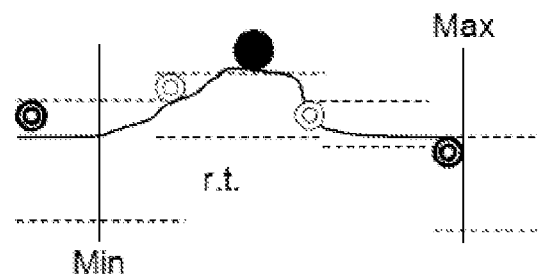

In FIG. 5C, the sampled parameter fluctuates up and down during the latch period. When the measurement value falls outside the control window, the measurement value may be stored locally as the maximum value, for example as indicated at 511 and 512. Because the current measurement value at the end of the latch period differs from the measurement at the beginning of the latch period, the current measurement value of the parameter is published by the controller in accordance with the reporting criteria. As a result, the current measurement value as indicated at the 514 and the maximum value during the latch period as indicated at 512 are published by the controller.

Figure 5D:
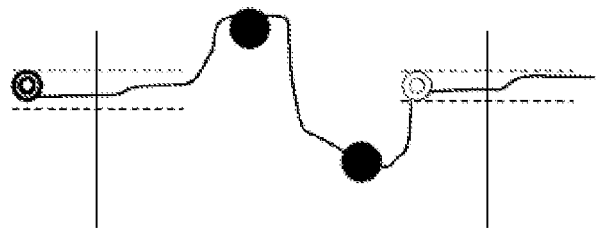

In FIG. 5D, the sampled parameter continues to fluctuate up and down during the latch period. In this scenario, sampled parameter falls outside the control window on both the high side and the low side as indicated at 522 and 523, respectively. These measurement values are stored respectively as the maximum value and the minimum value. At the end of the latch period, the current measurement value is substantially the same as at the parameter value at the beginning of the latch period and thus need not be published by the controller. The maximum value and the minimum values are published by the controller.

Figure 5E:
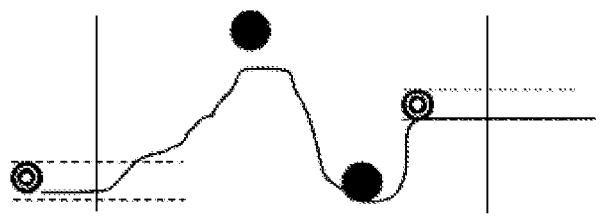

Likewise, the sampled parameter fluctuates up and down in FIG. 5E. In this scenario, the current measurement value at the end of the latch period differs from the parameter value at the beginning of the latch period. In addition to the maximum and minimum values, the current measure value is also published by the controller.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for communicating data amongst controllers in a power supply system, comprising:
   receiving, by a local controller, a present measure of a parameter indicative of an operating state of an uninterruptible power supply (UPS);
   comparing, by the local controller, the present measure to a control window for the parameter, where the control window defines a range of multiple values between a minimum value for the parameter and a maximum value for the parameter;
   adjusting, at the local controller, the range of values in the control window based on the present measure only in response to the present measure falling outside of the control window; and
   transmitting, by the local controller, the present measure via a controller area network to a managing controller only in response to the present measure falling outside of the control window.

2. The method of claim 1 further comprises
   receiving, by the local controller, a synchronization signal from the managing controller, thereby defining a reporting time interval; and
   transmitting, by the local controller, the present measure to the managing controller when the present measure falls outside of the control window and in response to receiving the synchronization signal.

3. The method of claim 2 further comprises
   receiving, by the local controller, an earlier measure of a parameter prior to receiving the present measure
   comparing, by the local controller, the earlier measure to the control window for the parameter;
   storing, by the local controller, the earlier measure as either a maximum value or a minimum value for the parameter during the reporting time interval when the earlier measure falls outside of the control window; and transmitting, by the local controller, the earlier measure to the managing controller in response to receiving the synchronization signal.

4. The method of claim 2 further comprises comparing, by the local controller, the present measure to a value for the parameter transmitted during a preceding reporting time interval; and transmitting, by the local controller, the present measure to the managing controller only when the present measure differs from the value of the parameter transmitted during the preceding time interval.

5. The method of claim 1 wherein updating the control window further comprises setting the minimum value and the maximum value for the control window so that the updated control window is centered around the present measure.

6. The method of claim 2 further comprises maintaining, by the local controller, a local timer during the reporting time interval;

transmitting, by the local controller, the present measure and value of the local timer to the managing controller, when the present measure falls outside of the control window and in response to receiving the synchronization signal; and resetting, by the local controller, the local timer in response to receiving the synchronization signal.

7. The method of claim 1 wherein the UPS having an output terminal selectively coupled to at least one of a bypass voltage source and an uninterruptible power source; a bypass switch electrically connected between the bypass voltage source and the output terminal; and a UPS switch electrically connected between the uninterruptible power source and the output terminal.

8. The method of claim 7 wherein the parameter is further defined as one of a voltage of the signal from a primary voltage source to the UPS, a frequency of the signal from the primary voltage source to the UPS, a voltage of the signal from a bypass voltage source to the UPS, a frequency of the signal from the bypass voltage source to the UPS.

9. The method of claim 7 wherein the parameter is further defined as one of an output voltage from the UPS, an output current from the UPS and a temperature of an inverter comprising the UPS.

10. A power supply system, comprising an uninterruptible power supply (UPS) having an output terminal selectively coupled to at least one of a bypass voltage source and an uninterruptible power source;

a bypass switch electrically connected between the bypass voltage source and the output terminal;

a UPS switch electrically connected between the uninterruptible power source and the output terminal, a first local controller interfaced with the uninterruptible power supply and configured to receive a present measure of a parameter associated with the UPS; and a managing controller in data communication with the first local controller, wherein the local controller is operable to compare the present measure to a control window and transmit the present measure to the managing controller only in response to the present measure falling outside of the control window, where the control window defines a range of multiple values between a minimum value for the parameter and a maximum value for the parameter and the local controller adjusts the range of values in the control window based on the present measure only in response to the present measure falling outside of the control window.

11. The power supply system of claim 10 wherein the managing controller is interconnected by a controller area network to the local controller.

12. The power supply system of claim 10 wherein the managing controller is configured to periodically transmit a synchronization signal to the local controller; and the local controller transmits the present measure to the managing controller when the present measure falls outside the control window and in response to receiving the synchronization signal.

13. The power supply system of claim 10 wherein is configured to receive an alternating current (AC) input signal from the bypass voltage source and the uninterruptible power source.

14. The power supply system of claim 12 wherein the UPS includes a converter configured to receive the AC input signal from the uninterruptible power source, where the converter includes a rectifier, an inverter, a boost circuit and a battery.

15. The power supply system of claim 10 wherein the parameter is further defined as one of a voltage of the signal from the uninterruptible power source to the UPS, a frequency of the signal from the uninterruptible power source to the UPS, a voltage of the signal from the bypass voltage source to the UPS, a frequency of the signal from the bypass voltage source to the UPS.

16. A power supply system, comprising an uninterruptible power supply (UPS) configured to receive an alternating current (AC) input signal from a bypass voltage source and a uninterruptible power source and having an output terminal selectively coupled to at least one of the bypass voltage source and the uninterruptible power source, wherein the UPS includes a bypass switch electrically connected between the bypass voltage source and the output terminal;

a converter circuit configured to receive the AC input signal from the uninterruptible power source;

a UPS switch electrically connected between the converter circuit and the output terminal, a first local controller interfaced with the uninterruptible power supply and configured to receive a present measure of a parameter associated with the UPS; and a managing controller in data communication with the first local controller, wherein the local controller is operable to compare the present measure to a control window and transmit the present measure via a controller area network to the managing controller only in response to the present measure falling outside of the control window, where the control window defines a range of multiple values between a minimum value for the parameter and a maximum value for the parameter.

17. The power supply system of claim 16 wherein local controller adjusts the range of value in the control window based on the present measure when the present measure falls outside of the control window.

18. The power supply system of claim 16 wherein the managing controller is configured to periodically transmit a synchronization signal to the local controller; and the local controller transmits the present measure to the managing controller when the present measure falls outside the control window and in response to receiving the synchronization signal.

* * * * *